United States Patent [19]

Fasulo et al.

[11] Patent Number: 4,939,207

[45] Date of Patent: Jul. 3, 1990

[54] BLENDS BASED ON VINYL-AROMATIC POLYMERS ENDOWED WITH HIGH TENACITY AND CHEMICAL RESISTANCE

[75] Inventors: Gian C. Fasulo, S. Silvestro da Curtatone; Annibale Vezzoli, Carugo; Giorgio Vittadini, Milan, all of Italy

[73] Assignee: Montedipe S.p.A., Milan, Italy

[21] Appl. No.: 193,587

[22] Filed: May 13, 1988

[30] Foreign Application Priority Data

May 14, 1987 [IT] Italy ................... 20510 A/87

[51] Int. Cl.$^5$ ............... C08L 9/06; C08L 47/00; C08L 53/02
[52] U.S. Cl. ........................... 525/89; 525/98; 525/99
[58] Field of Search .................. 525/89, 98, 99

[56] References Cited

U.S. PATENT DOCUMENTS 4,039,629  8/1977  Himes et al. .................. 525/89
4,216,131  8/1980  Himes et al. .................. 525/89

Primary Examiner—Jacob Ziegler
Attorney, Agent, or Firm—Stevens, Davis, Miller & Mosher

[57] ABSTRACT

Blends based on vinyl-aromatic polymers endowed with high tenacity and good chemical resistance, comprising:

40 to 98% by weight of a vinyl-aromatic polymer containing from 0.5 to 5% by weight of a vinyl-aromatic monomer conjugated diene block copolymer;

1–54% by weight of a polyolefine; and

1–20% by weight of a vinyl-aromatic monomer-conjugated diene star block copolymer; the sum of the three components being equal to 100%.

13 Claims, No Drawings

BLENDS BASED ON VINYL-AROMATIC POLYMERS ENDOWED WITH HIGH TENACITY AND CHEMICAL RESISTANCE

DESCRIPTION OF THE INVENTION

The present invention relates to polymeric blends based on vinyl-aromatic polymers showing high tenacity and good chemical resistance.

More particularly, the present invention relates to blends based on vinyl-aromatic polymers having high tenacity and good chemical resistance suitable to be transformed into shaped bodies endowed with good physical properties.

As is known, vinyl-aromatic polymers are thermoplastic resins which can be transformed, under heating, into shaped bodies by injection or extrusion molding. Such vinyl-aromatic polymers have a fair tenacity, but they are not suitable for use in applications where a high tenacity associated with good chemical resistance is required.

A way of improving those missing properties is to provide a blend with other polymers having the necessary properties so as to give a material having the desired combination of properties.

However, this approach has been successful only in a limited number of cases; in fact, generally, the blending results in combining the worst characteristics of each component, the overall result being a material of such poor properties as not to be of any practical or commercial value.

The reasons for this failure are the fact that not all polymers are compatible with each other and, therefore, do not perfectly adhere. As a result, interfaces are formed among the components of the blend which represent weakness and breaking points.

More particularly, the blending of polystyrene, or generally of a vinyl-aromatic polymer or copolymer, and a polyolefine, gives rise to blends endowed with heterogeneous structure and mechanical weakness, due to the incompatibility between these two types of polymers.

Applicants have now found, in accordance with the present invention, that homogeneous polymeric compositions containing a polyolefine and a vinyl-aromatic polymer may be prepared by using a vinyl-aromatic polymer containing small quantities of a vinyl aromatic monomer-conjugated diene linear block polymer as elastomeric component, and by using a vinyl aromatic monomer-conjugated diene star-block polymer, as a compatibilizing agent between the polyolefine and the vinyl-aromatic polymer.

Thus, the present invention is a polymeric blend comprising:

from 40 to 98% by weight of a vinyl-aromatic polymer containing, as a dispersed phase and as an elastomeric component, from 0.5 to 5% by weight of a vinyl aromatic monomer-conjugated diene linear block copolymer;
from 1 to 54% by weight of a polyolefine; and
from 1 to 20% by weight of a vinyl aromatic monomer conjugated diene star-block copolymer; the sum of the three components being equal to 100%.

Preferably, the polymeric blends of the present invention contain:
45-65% by weight of a vinyl aromatic polymer containing, as a dispersed phase and as an elastomeric component, from 0.5 to 5% of a vinyl aromatic monomer-conjugated diene linear block copolymer;
45-30% by weight of a polyolefine; and
5-10% by weight of a vinyl aromatic monomer-conjugated diene star-block copolymer; the sum of the three components being equal to 100%.

The amount of the vinyl aromatic monomer-conjugated diene linear block copolymer, used as an elastomeric component in the vinyl-aromatic polymer (a), is preferably between 1 and 3% by weight. It is per se well known in the art and available on the market.

These linear block copolymers contain from 20 to 60% by weight of recurring units of a vinyl aromatic monomer and, correspondingly, from 80 to 40% by weight of recurring units of a conjugated diene, and they are of the type:

B/S and S—(B/S)

wherein S are polymeric blocks based on the vinyl aromatic monomer and B/S are blocks of copolymers of the "random" and/or "tapered" type of the vinyl aromatic monomer and of the conjugated diene.

These linear block copolymers may be prepared according to the method disclosed in U.S. Pat. No. 3,149,182.

It is preferred to polymerize first the mono vinyl aromatic monomer, by anionic polymerization, in an inert solvent and in the presence of an organo-metallic lithium catalyst (initiator), and then to add the conjugated diene so as to form a polymeric chain of conjugated dienes in the already formed polymeric chain of vinyl aromatic monomers.

The preparation of the block copolymers is carried out in an inert hydrocarbon solvent such as isobutane, pentane, hexane, cyclohexane, benzene, toluene, xylene, and the like.

The polymerization is carried out in the absence of air, moisture or other impurities, which as is well-known, affect adversely the anionic catalytic system. The polymerization temperature may be kept between 0° and 120° C., and preferably between 40° and 80° C.

As initiator the generally used lithium alkyl, cycloalkyl or aryl compounds may be used, such as for instance methyl-lithium, n.-butyl-lithium, sec.-butyl-lithium, cyclohexyl-lithium, phenyl-lithium, p.-tolyl-lithium and naphthyl-lithium, in a quantity generally between 0.2 and 20 millimols per mole of monomer.

The polymerization is ended by adding a chain stopper such as alcohol, water or oxygen.

The molecular weight of the block polymer may vary within a wide range, although a molecular weight lower than 100,000 is preferred.

The properties, structure and characteristic of these block copolymers are reported by Holden in "Block and Graft Copolymerization", Chapter 6, pages 133–191, the contents of which are to be regarded as an integral part of the present application.

Block copolymers of this type are available on the market for example as "Stereon 840" sold by Firestone Synthetic Rubber and Latex Co. Akron (Ohio), or as the S-B/S block copolymer sold by Shell Chemical Company under the trade name "Kraton 2103", "Kraton 2104", "Kraton 2113", etc.

The vinyl aromatic monomer-conjugated diene star block copolymer used as a compatibilizing agent in the composition of the present invention, is also of a known type and available on the market. This star block copolymer is of the type:

(S—S/B)$_n$—X—(B/S)$_m$ wherein S and S/B have the above meanings and X is a radical coming from a polyfunctional coupling agent, m and n being integers the sum of which is between 2 and 20 and corresponding to the functionality of radical X.

These starblock copolymers are generally prepared by forming first the linear block copolymer of the B/S and S—B/S type having active lithium atoms at an end of the chain by using the above method.

These linear and active polymeric chains are then coupled by the addition of a polyfunctional compound having at least two reactive sites able to react with the C—Li bond of each polymeric chain, with coupling of the polymeric chains on the functional group of the compound.

As a polyfunctional coupling agent any compound may be used having functional groups able to react with lithium-carbonium bonds, in order to link the carbon atom chain to the polyfunctional group. Typical examples of polyfunctional coupling agents are the polyepoxides, such as for instance the epoxidized polybutadiene, the epoxidized soybean oil, the epoxidized linseed oil, polyesters such as diethyl-adipate, polyhalides such as silicon tetrachloride; polyisocyanates such as 1,2,4-benzene-triisocyanate; polyimines; polyaldehydes; polyketones; polyanhydrides such as pyromellitic di-anhydride; halides of polyacids, such as the chloride of mellitic acid, etc.; poly-vinyl aromatic compounds, such as divinyl-benzene may be also used as coupling agents. The divinyl-benzene polymerizes to form in situ polyfunctional coupling agents.

The coupling must be followed by a termination, generally with methanol, water or carbon dioxide.

The type and the quantity of the coupling agent depend on the number of polymeric chains containing the lithium-terminated ends and on the number of desired arms for each starblock molecule. Thus, for coupling agents having a fixed number of functional groups such as for instance silicon tetrachloride, an equivalent of coupling agent for each equivalent of lithium-terminated polymeric chains, gives rise to a 4-arms starblock copolymer. In the case of difunctional agents which polymerize during the coupling reaction, such as for instance divinyl-benzene, the amount of coupling agent is determined by the reaction conditions, the number of equivalent functional sites being variable.

The monovinyl-aromatic compound particularly suitable for the preparation of the copolymers of the present invention is styrene; alkyl-substituted styrenes showing the same copolymerization properties, such as for instance methyl-styrenes, ethyl-styrenes, t.-butyl-styrenes, etc., may also be used.

Conjugated dienes useful for preparing the copolymers of the present invention are those having from 4 to 8 carbon atoms in the molecule, such as for instance 1,3-butadiene, isoprene, 2,3-dimethyl-1,3-butadiene, piperylene, and mixtures thereof.

The term "vinyl-aromatic copolymer", as used in the present specification and claims, is to be understood as including any solid thermoplastic polymer and corresponding copolymer consisting essentially of (i.e., containing in a chemically bound form) at least 50% by weight of one or more vinyl-aromatic compounds of the formula:

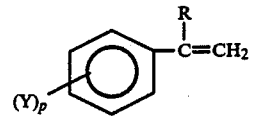

wherein R represents hydrogen or an alkyl radical having from 1 to 4 carbon atoms; p is zero or an integer from 1 to 5, and Y represents a halogen atom (especially chlorine) or an alkyl radical having from 1 to 4 carbon atoms.

Examples of vinyl-aromatic compounds having the above formula are: styrene, methyl-styrene, mono-, di-, tri-, tetra-and penta-chlorostyrene and the corresponding alpha-methyl-styrenes; styrenes alkylated in the nucleus and the corresponding alpha-methyl-styrenes such as ortho- and para-methyl-styrenes, ortho- and para-ethyl-styrenes or ortho- and para-methyl-alpha-methyl-styrenes, etc. These monomers may be used either alone or in admixture with each other or with other copolymerizable co-monomers such as, for instance, maleic anhydride.

Rubbers are generally used for making the vinyl-aromatic polymers impact resistant. According to the present invention, the rubber content in the styrenic polymer does not exceed 15% by weight. Quantities between 2% and 12% by weight are preferred.

The rubbers which are used for this purpose are: polybutadiene, high or medium cis- and low viscosity polybutadiene, poly-isoprene, copolymers of butadiene and/or isoprene with styrene or with other monomers.

An essential feature of the present invention is that the vinyl aromatic polymer used in the preparation of the blends of the present invention contains, dispersed in the polymeric matrix, from 0.5 to 5% by weight, and preferably from 1 to 3% by weight, of a monomer vinyl aromatic-conjugated diene block copolymer of the above reported type S/B and/or S—S/B.

The amount of said vinyl-aromatic polymer, containing a linear block copolymer S/B and/or S—S/B, and optionally a rubber, does not exceed 15% by weight; it may be obtained according to any known suspension, bulk-suspension, or continuous-bulk polymerization process.

A preferred method of preparation consists essentially in carrying out a pre-polymerization of the vinyl-aromatic monomer, in the presence of a conventional free radical catalyst, of a rubber and of the above block copolymer in a first reactor up to the attainment of a conversion lower than 50% by weight of the fed monomers.

Then, the polymerization is completed in one or more subsequent reactors up to the end of the monomer polymerization. The thus-obtained polymer is then devolatilized and granulated.

The polyolefine is preferably selected from linear low density (LLDPE), medium density, and high density polyethylene,.

Other polyolefines such as polypropylene, polybutene, polymethylpentene, as well as the copolymers of two or more alpha-olefines such as, for example, ethylene-propylene copolymers, the copolymers of an alpha-olefine with an ethylenically unsaturated monomer, such as for example ethylene-vinyl acetate (EVA) copolymers, also may be used.

The blends of the present invention ma be prepared by carrying out first a blending of the components at a low temperature, in any known type of mixer. Then, the blend is extruded in single-screw or twin-screw extruders at a temperature preferably between 150° and 250° C.

The compositions may contain a small amount, generally from 0.1 to 3% by weight, of a stabilizing agent or of other additives, intimately mixed therein.

Plasticizers, lubricants, anti-flame agents, blowing agents, anti-static agents, dyestuffs, pigments, foaming agents (to provide lighter articles and lighter semi-finished products) may be added during the mixing step of the components, in quantities from 0.1 to 10% by weight.

The blends of the present invention may be easily processed and show a set of properties which, on the whole, are significantly better than those of the separate components. For this reason, the polymeric blends of the present invention find useful application for obtaining materials endowed with high tenacity combined with high chemical resistance, such as oil- and Freon-resistance.

Therefore, said blends are useful in the field of electric appliances, electronics, and generally in the field of technical materials, in the form of a film, sheet, tape, band, rod, box, cup, container, etc.

The blends may be used to provide foamed articles by techniques per se known in the art.

The following illustrative but not limiting examples are given in order still better to comprehend the present invention and to put it into practice.

In the examples all parts are expressed by weight, unless otherwise indicated.

EXAMPLES 1–7

Into a rotating drum blender there were blended, at room temperature:

1. Polymer A: an impact-resistant styrene polymer containing dispersed in the polymeric matrix, 7.75% by weight of a polybutadiene rubber, and 3% of an S/B linear block copolymer containing 25% of styrene and 75% of butadiene, having a molecular weight of 75,000;

2. Polymer B: a linear low density polyethylene LLDPE) having a density of 0.926 g/cm$^3$ and an M.F.I. of 0.7 g/10 min.;

3. Polymer C: a starblock copolymer comprising 70% by weight of butadiene and 30% by weight of styrene, containing silicon as coupling radical, each polymeric unit having a molecular weight of 40,000.

The blend compositions are reported in the following Table 1.

The thus-obtained blends were extruded from a twin-screw WERNER PFLEIDERER 2ps K28 extruder having a diameter of 28 mm.

The thermal profile of the extruder between the hopper and the extrusion head was 150° C., 180° C., 190° C., 215° C.

In order to determine the properties, the granules were injection-molded at a temperature of 190° C. on a NEGRIBOSSI-17-110 FA injection-molding press in order to obtain test pieces having sizes according to standard specifications.

The properties measured on the thus-obtained test pieces are reported in the following Table 1.

To measure the characteristics of the blends of the present invention, the following methods were used:

A. Thermal properties. Softening temperature Vicat at 1 Kg and 5 Kg was determined according to ISC 306.

B. Rheological properties. Melt flow index (M.F.I.) was determined according to ASTM T.1238, at 220° C. and 5 Kg.

C. Mechanical properties. Tensile strength and elastic modulus were measured according to ASTM-D 638; IZOD resilience (with notch) at 23° C., was measured according to ASTM D 256, on test pieces having a 6.4 mm thickness.

TABLE 1

| | Examples | | | | | | |
|---|---|---|---|---|---|---|---|
| | 1 | 2 | 3 | 4 | 5 | 6 | 7 |
| Composition | | | | | | | |
| Polymer A % b.w. | 50 | 45 | 55 | 65 | 80 | 70 | 80 |
| Polymer B % b.w. | 50 | 45 | 35 | 25 | 10 | 25 | 15 |
| Polymer C % b.w. | — | 10 | 10 | 10 | 10 | 5 | 5 |
| Thermal Properties Units | | | | | | | |
| VICAT at 5 kg °C. | 64 | 55 | 63 | 66 | 79 | 72 | 78 |
| VICAT at 1 K °C. | 102 | 100 | 97 | 98 | 99 | 99 | 98 |
| Rheological properties | | | | | | | |
| M.F.I. g/10' | 3.0 | 2.0 | 2.5 | 2.5 | 2.3 | 2.3 | 2.4 |
| Mechanical Properties | | | | | | | |
| Yield point N/mm$^2$ | 16.5 | 12.5 | 18 | 17 | 25.5 | 21 | 26 |
| Ultimate tensile Strength N/mm$^2$ | 16.0 | 16.5 | 21 | 22 | 26 | 24.5 | 27 |
| Ultimate Elongation % | 11 | 75 | 47 | 51 | 36 | 47 | 45 |
| Modulus of Elasticity N/mm$^2$ | 850 | 600 | 1000 | 1050 | 1750 | 1450 | 1600 |
| IZOD J/m | 25 | 500 | 382 | 408 | 350 | 291 | 280 |

EXAMPLE 8

By operating according to the procedure of Examples 1–7, a blend having the following composition was prepared:
Polymer A: 60% by weight
Polymer B: 30% by weight
Polymer C: 10% by weight
Specimens having a thickness of 2.1 mm and shape and size according to AGK 31 (Environmental Stress Cracking) were prepared in order to determine the resistance to cracking. The specimens were obtained by compression-molding at 180° C. and at 160 kg/cm$^2$, for 6 minutes.

Cooling rate was about 10° C./1',

Said specimens were smeared with an olive oil/oleic acid 50/50 by weight mixture and subjected to bending with constant load of 7.5 M Pa.

The resistance to cracking was measured and expressed as the ratio of the elongation of the test piece after 30 minutes ($E_{30}$) or after 50 minutes ($E_{50}$) to the start elongation ($E_o$).

The same test of resistance to cracking was carried out on specimens dipped in gaseous Algofrene 11 (trichlorofluoro methane).

The results of the tests were:

| | |
|---|---|
| Resistance to cracking in olive oil/oleic acid mixture | $E_0 = 60\%$ $E_{30}/E_o = 80\%$ $E_{50}/E_o = 80\%$ |
| Resistance to cracking in Algofrene 11 | $E_0 = 60\%$ $E_{30}/E_o$ 100% $E_{50}/E_o$ 100% |
| Resistance to cracking | $E_0 = 60\%$ $E_{30}/E_o > 100\%$ $E_{50}/E_{Eo} > 100\%$ |

EXAMPLE 9

By operating according to the procedure of Example 8, a blend having the following composition was prepared:
Polymer A: 75% by weight
Polymer B: 15% by weight
Polymer C: 10% by weight The blend showed the following resistances to cracking in oil/oleic acid mixture (50/50) and in Algofrene 11:

| | |
|---|---|
| Resistance to cracking in olive oil/oleic acid mixture | $E_0 = 40\%$ <br> $E_{30}/E_o = 60\%$ <br> $E_{50}/E_o = 36\%$ |
| Resistance to cracking in Algofrene 11 | $E_0 = 40\%$ <br> $E_{30}/E_o > 100\%$ <br> $E_{50}/E_o > 100\%$ |

EXAMPLE 10-13

Example 2 was repeated replacing the linear low density polyethylene (LLDPE) by the same amount of, respectively, an ethylene-vinyl acetate copolymer (EVA) having an M.F.I. of 5 g/10 min. and a vinyl acetate content of 14% by weight (Example 10); a crystalline polypropylene consisting of prevailingly isotactic macromolecules having a melt index (M.F.I.) of 12.5, and a residue to the extraction with heptane of 97.6% (Example 11); a low density polyethylene (LDPE) having an M.F.I. of 2.4 g/10 minutes and a density of 0.923 (g/cm$^3$) (Example 12); and a high density polyethylene (HDPE) having an M.F.I. of 0.3 g/10 minutes and a density of 0.955 g/cm$^3$ (Example 13).

The properties of the blends are:

| Properties | Units | Examples | | | |
|---|---|---|---|---|---|
| | | 10 | 11 | 12 | 13 |
| VICAT at 5 Kg. | °C. | 38 | 71 | 42.5 | 67.5 |
| VICAT at 1 Kg. | °C. | 72 | 114 | 88 | 102 |
| M.F.I. | g/10' | 6.9 | 8.5 | 4.5 | 1.8 |
| Yield Point | N/mm$^2$ | 5.5 | — | 9.5 | 20 |
| Ultimate tensile strength | N/mm$^2$ | 10 | 25 | 13 | 23 |
| Ultimate elongation | % | 39 | 45 | 25 | 48 |
| Modulus of elasticity | N/mm$^2$ | 300 | 1100 | 450 | 1100 |
| IZOD | J/m | 302 | 90 | 182 | 235 |

What is claimed is:

1. A blend based on aromatic vinyl polymers having high tenacity and good chemical resistance, comprising:
   (a) a vinyl aromatic polymer containing, as an elastomer component, a small amount of a vinyl aromatic monomer-conjugated linear block copolymer;
   (b) a polyolefine; and
   (c) a vinyl aromatic monomer-conjugated diene star block copolymer, as a compatibilizing agent between the polyolefine and the vinyl aromatic polymer.

2. A blend based on vinyl aromatic polymers according to claim 1, comprising:
   from 40 to 98% by weight of a vinyl aromatic polymer containing dispersed, as an elastomeric component, from 0.5 to 5% by weight of a vinyl aromatic monomer-conjugated diene linear block copolymer;
   from 1 to 54% by weight of a polyolefine; and
   from 1 to 20% by weight of a vinyl aromatic monomer-conjugated diene star block copolymer; the sum of the above three components being equal to 100%.

3. A blend based on vinyl aromatic polymers according to claim 1 or 2, comprising:
   from 45 to 65% by weight of a vinyl aromatic polymer containing dispersed, as an elastomeric component, from 0.5 to 5% of a vinyl aromatic monomer-conjugated diene linear block copolymer;
   from 45 to 30% by weight of a polyolefine; and
   from 5 to 10% by weight of a vinyl aromatic monomer-conjugated diene star block copolymer; the sum of the above three components being equal to 100%.

4. A blend based on aromatic vinyl polymers according to claim 1 or 2, wherein the vinyl aromatic polymer contains, as a dispersed phase, from 1 to 3% by weight of a vinyl aromatic monomer-conjugated diene linear block copolymer.

5. A blend based on aromatic vinyl polymers according to claim 1 or 2, wherein the vinyl aromatic monomer-conjugated diene linear block copolymer contains from 20 to 60% by weight of recurring units of a vinyl aromatic monomer and, correspondingly, from 80 to 40% by weight of recurring units of a conjugated diene.

6. A blend based on vinyl aromatic polymers according to claim 1 or 2, wherein the linear block copolymer is of the type $$B/S \text{ and } S-(B/S)$$

wherein S are polymeric blocks based on vinyl aromatic monomer, B/S are blocks of copolymers of the "Random" and/or "Tapered" type of the vinyl aromatic monomer and of the conjugated diene.

7. A blend based on vinyl aromatic polymers according to claim 1 or 2, wherein the vinyl aromatic monomer-conjugated diene star block copolymer is of the type:

$$(S-S/B)_n-X-(B/S)_m$$

wherein S are polymeric blocks based on vinyl aromatic monomers, B/S are "Random" and/or "Tapered" copolymeric blocks of the vinyl aromatic monomer and of the conjugated diene, X is a radical coming from a polyfunctional coupling agent, and m and n are integers the sum of which is between 2 and 20 and is equal to the functionality of the X radical.

8. A blend based on vinyl aromatic polymers according to claim 1 or 2, wherein the vinyl aromatic polymer contains an amount of rubber not exceeding 15% by weight.

9. A blend based on vinyl aromatic polymers according to claim 1 or 2, wherein the polyolefine is polyethylene of the linear low density, high density, or medium density type.

10. A blend based on vinyl aromatic polymers according to claim 1 or 2, wherein the polyolefine is polypropylene, a copolymer of two or more alpha-olefines, or a copolymer of an alpha-olefine with an ethylenically unsaturated monomer different from the alpha-olefines.

11. A blend based on vinyl aromatic polymers according to claim 1 or 2, wherein the vinyl aromatic polymer contains chemically bonded, at least 50% by weight of at least one vinyl aromatic monomer having the formula:

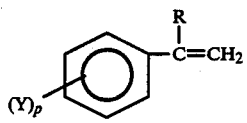 (II)

wherein:

R represents hydrogen or an alkyl radical having from 1 to 4 carbon atoms;

p is 0 or an integer between 1 and 5; and

Y represents a halogen atom or an alkyl radical having from 1 to 4 carbon atoms.

12. A blend based on vinyl aromatic polymers according to claim 1 or 2, wherein the vinyl aromatic monomer is styrene and the conjugated diene contains from 4 to 8 carbon atoms in the molecule.

13. A blend based on vinyl aromatic polymers according to claim 12, wherein the conjugated diene is 1,3-butadiene.

* * * * *